United States Patent
Ji et al.

(10) Patent No.: US 10,923,123 B2
(45) Date of Patent: Feb. 16, 2021

(54) TWO-PERSON AUTOMATIC SPEECH RECOGNITION TRAINING TO INTERPRET UNKNOWN VOICE INPUTS

(71) Applicant: Motorola Mobility LLC, Chicago, IL (US)

(72) Inventors: Zhengping Ji, Hinsdale, IL (US); Rachid M. Alameh, Crystal Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 96 days.

(21) Appl. No.: 16/297,298

(22) Filed: Mar. 8, 2019

(65) Prior Publication Data
US 2020/0286475 A1    Sep. 10, 2020

(51) Int. Cl.
| | |
|---|---|
| *G10L 15/22* | (2006.01) |
| *G10L 15/07* | (2013.01) |
| *G10L 25/66* | (2013.01) |
| *G06N 20/00* | (2019.01) |
| *G06N 5/02* | (2006.01) |
| *G10L 15/06* | (2013.01) |

(52) U.S. Cl.
CPC ............ *G10L 15/22* (2013.01); *G06N 5/02* (2013.01); *G06N 20/00* (2019.01); *G10L 15/063* (2013.01); *G10L 15/07* (2013.01); *G10L 25/66* (2013.01)

(58) Field of Classification Search
CPC .......... G10L 15/22; G10L 15/28; G10L 15/34
See application file for complete search history.

(56) References Cited

U.S. PATENT DOCUMENTS

| | | | |
|---|---|---|---|
| 2003/0212547 A1* | 11/2003 | Engelke | G10L 15/26 704/200 |
| 2009/0119105 A1* | 5/2009 | Kim | G10L 15/07 704/244 |
| 2020/0098351 A1* | 3/2020 | Feinstein | G10L 15/063 |
| 2020/0175961 A1* | 6/2020 | Thomson | G10L 15/063 |
| 2020/0175987 A1* | 6/2020 | Thomson | G10L 15/30 |
| 2020/0243094 A1* | 7/2020 | Thomson | G10L 15/265 |

* cited by examiner

*Primary Examiner* — Daniel Abebe
(74) *Attorney, Agent, or Firm* — FIG. 1 Patents

(57) ABSTRACT

A system receives a first voice input from a first user, such as a baby or a person who has had a stroke. Although the first user intends to communicate a particular meaning, the first voice input is not in a language that is known to the system and thus the system does not know the particular meaning that the first user intended. After receiving the first voice input, a second voice input is received from a second user. This second voice input is in a language that is known to the system. The system determines a meaning of the second voice input, associates this meaning with the first voice input, and uses this association to train a machine learning system. This machine learning system is used to attempt to understand the meaning of subsequent voice inputs received from the first user.

20 Claims, 6 Drawing Sheets

TWO-PERSON AUTOMATIC SPEECH RECOGNITION TRAINING TO INTERPRET UNKNOWN VOICE INPUTS

BACKGROUND

As technology has advanced, people have become increasingly reliant upon a variety of different computing devices, including wireless phones, tablets, laptops, and so forth. One feature that people oftentimes expect from their devices is automatic speech recognition—people expect to be able to input commands or text verbally and have their devices understand what words they spoke. However, certain groups of people, such as babies or people who have had a stroke, can "talk" (pronounce a sequence of phonemes with specific tones), but without language meaning that an automatic speech recognition system can understand. These situations can lead to user frustration and dissatisfaction with their devices because the words that were verbally input to the device are not understood by the device.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

In accordance with one or more aspects, a first voice input is received from a first user and a determination is made that the first voice input is not in a known language to the unknown voice input interpretation system. A second voice input is received, subsequent to receiving the first voice input, from a second user. A meaning of the second voice input is determined and the meaning of the second voice input is associated with the first voice input. The first voice input and the meaning of the second voice input are used to train a machine learning system of the unknown voice input interpretation system to understand voice inputs from the first user. A third voice input is received from the first user, and the machine learning system is used to determine a meaning of the third voice input.

In accordance with one or more aspects, a computing device includes a processor and a computer-readable storage medium having stored thereon multiple instructions that implement an unknown voice input interpretation system and that, responsive to execution by the processor, cause the processor to perform acts. The acts include determining that a first voice input received from a first user is not in a known language to the unknown voice input interpretation system, determining a meaning of a second voice input received, subsequent to receipt of the first voice input, from a second user, and associating the meaning of the second voice input with the first voice input. The acts further include using the first voice input and the meaning of the second voice input to train a machine learning system of the unknown voice input interpretation system to understand voice inputs from the first user, and using the machine learning system to determine a meaning of a third voice input received from the first user.

In accordance with one or more aspects, an unknown voice input interpretation system includes a speech recognition module, a natural language understanding module, a training module, and a machine learning system. The speech recognition module, implemented at least in part in hardware, is configured to determine that a first voice input received from a first user is not in a known language to the unknown voice input interpretation system. The natural language understanding module, implemented at least in part in hardware, is configured to determine a meaning of a second voice input received, subsequent to receipt of the first voice input, from a second user. The training module, implemented at least in part in hardware, is configured to associate the meaning of the second voice input with the first voice input, and to use the first voice input and the meaning of the second voice input to train a machine learning system of the unknown voice input interpretation system to understand voice inputs from the first user. The machine learning system, implemented at least in part in hardware, is configured to determine a meaning of a third voice input received from the first user.

BRIEF DESCRIPTION OF THE DRAWINGS

Embodiments of two-person automatic speech recognition training to interpret unknown voice inputs are described with reference to the following drawings. The same numbers are used throughout the drawings to reference like features and components.

DETAILED DESCRIPTION

Figure 1:
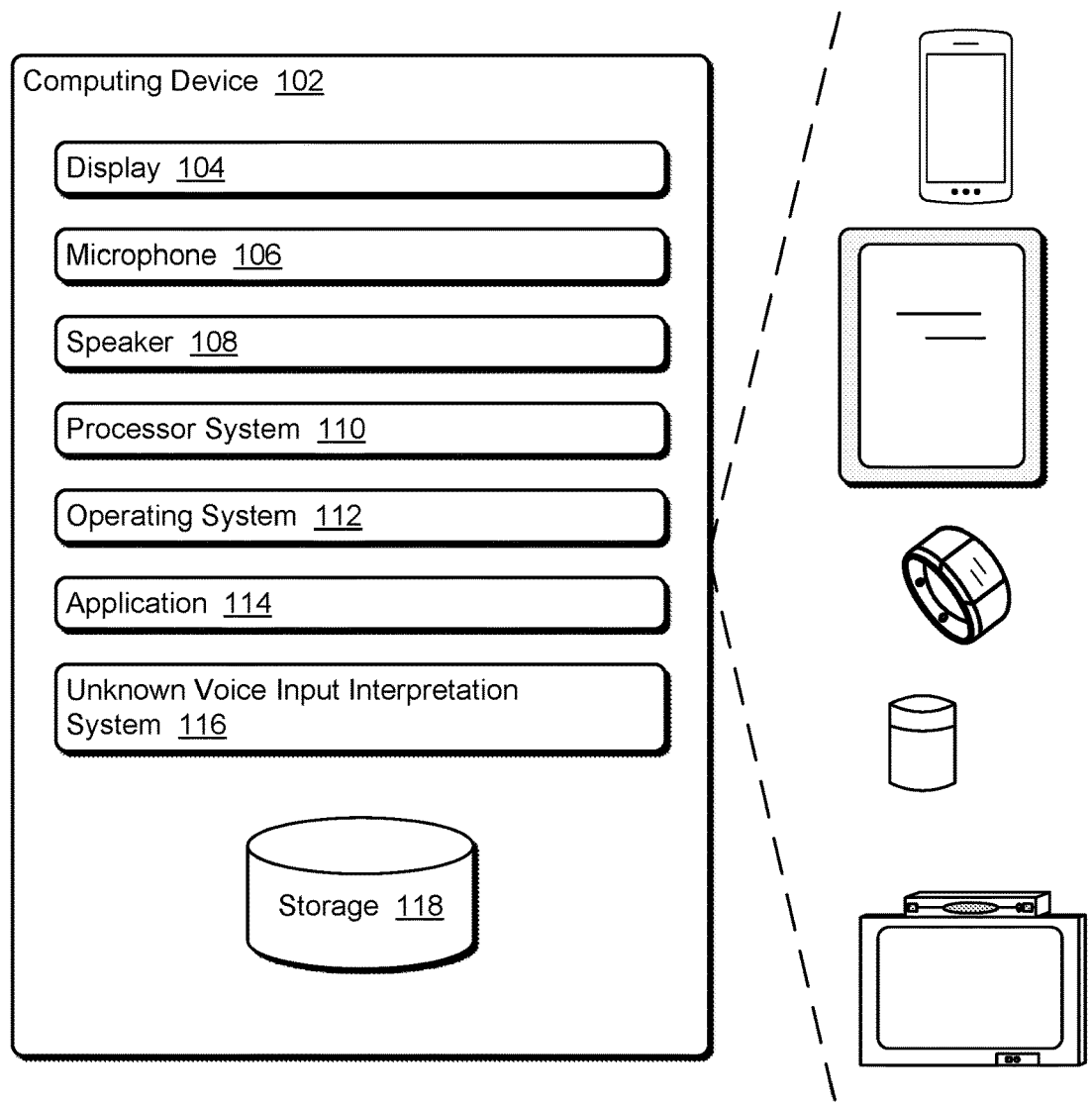
FIG. 1 illustrates an example computing device implementing the techniques discussed herein.

Two-person automatic speech recognition training to interpret unknown voice inputs is discussed herein. A voice input as used herein refers to a sequence of oral sounds from a user that has a beginning and an ending. The beginning of the voice input is when the oral sounds from the user start, such as when the oral sounds exceed a threshold level (e.g., 25 decibels (dB)). The ending of the voice input is when the oral sounds from the user end, such as when there is at least a threshold amount of time, such as 2 seconds, where there is no oral sound from the user above a threshold level (e.g., 25 dB).

An unknown voice input interpretation system receives a voice input from a first user and determines that the voice input is not in a language that is known to the unknown voice input interpretation system. The voice input can be, for example, a voice input from a baby, a person who has had a stroke, a person speaking in a language the unknown voice input interpretation system (e.g., person speaking in Chinese whereas the unknown voice input interpretation system detects English), and so forth. Although the voice input can be a sequence of phonemes with specific tones that the first user intends to communicate a particular meaning, the voice input is not in a language known to the unknown voice input interpretation system and thus the unknown voice input interpretation system does not know the particular meaning that the first user intended.

After receiving the voice input from the first user, an additional voice input is received from a second user within a timed window. This additional voice input is in a language that is known to the unknown voice input interpretation system, which determines a meaning of the additional voice input. The unknown voice input interpretation system also associates the meaning of the additional voice input with the voice input received from the first user, and uses this association to train a machine learning system of the unknown voice input interpretation system. The unknown voice input interpretation system uses this machine learning system to attempt to understand the meaning of subsequent voice inputs received from the first user. Thus, the unknown voice input interpretation system effectively begins to learn the language of the first user, associating voice inputs of the first user with the appropriate meanings.

In one or more embodiments, the unknown voice input interpretation system associates the meaning of the additional voice input with the voice input received from the first user only if context information indicates to make the association. This context information can include various different information, such as the additional voice input being received from the second user within a timed interval (e.g., 15 seconds) of receipt of the voice input from the first user, the first user having a known relationship with the second user (e.g., the first user is a child or spouse of the second user), the additional voice input from the second user is determined to be in response to the first user, and so forth.

Thus, for example, the first user may be a baby and the second user may be the baby's mother. The baby's mother has learned that her baby makes one sound to indicate he is hungry and another sound to indicate he is tired. When the baby makes one sound that the mother interprets as being hungry, the mother may respond to the baby saying something like "I'll feed you in a few minutes". The unknown voice input interpretation system receives the sound from the baby (which is the voice input from the first user) and the mother's response (which is the additional voice input from the second user), determines from the mother's response that the baby is hungry, and associates the sound from the baby with the meaning that the baby is hungry. This association is used to train the machine learning system so that the unknown voice input interpretation system can recognize the meaning of subsequent voice inputs from the baby (e.g., the baby making the same sound again).

The techniques discussed herein improve the performance of the computing device in recognizing voice inputs by learning to understand language previously unknown to the device. The computing device does this by leveraging the receipt of the additional voice input from the second user that is a known language to the computing device. Thus, rather than focusing training of the machine learning system on a single person, the interpretation by one person of an unknown voice input from another person is used for training the machine learning system. This allows the computing device to learn to understand the sounds that certain individuals, such as babies or people that have suffered a stroke, use to convey particular meanings, thus effectively learning the language that those certain individuals are communicating in.

Furthermore, by leveraging the receipt of the additional voice input from the second user that is a known language to the computing device, the machine learning system is trained automatically rather than requiring users to manually label the voice inputs. Freeing users from manually labeling the voice inputs reduces the time and manpower taken to train the machine learning system.

FIG. 1 illustrates an example computing device 102 implementing the techniques discussed herein. The computing device 102 can be, or include, many different types of computing or electronic devices. For example, the computing device 102 can be a smartphone or other wireless phone, a notebook computer (e.g., netbook or ultrabook), a laptop computer, a camera (e.g., compact or single-lens reflex), a wearable device (e.g., a smartwatch, an augmented reality headset or device, a virtual reality headset or device), a tablet or phablet computer, a personal media player, a personal navigating device (e.g., global positioning system), an entertainment device (e.g., a gaming console, a portable gaming device, a streaming media player, a digital video recorder, a music or other audio playback device), a video camera, an Internet of Things (IoT) device, an automotive computer, and so forth.

The computing device 102 includes a display 104, a microphone 106, and a speaker 108. The display 104 can be configured as any suitable type of display, such as an organic light-emitting diode (OLED) display, active matrix OLED display, liquid crystal display (LCD), in-plane shifting LCD, projector, and so forth. The microphone 106 can be configured as any suitable type of microphone incorporating a transducer that converts sound into an electrical signal, such as a dynamic microphone, a condenser microphone, a piezoelectric microphone, and so forth. The speaker 108 can be configured as any suitable type of speaker incorporating a transducer that converts an electrical signal into sound, such as a dynamic loudspeaker using a diaphragm, a piezoelectric speaker, non-diaphragm based speakers, and so forth.

Although illustrated as part of the computing device 102, it should be noted that one or more of the display 104, the microphone 106, and the speaker 108 can be implemented separately from the computing device 102. In such situations, the computing device 102 can communicate with the display 104, the microphone 106, and/or the speaker 108 via any of a variety of wired (e.g., Universal Serial Bus (USB), IEEE 1394, High-Definition Multimedia Interface (HDMI)) or wireless (e.g., Wi-Fi, Bluetooth, infrared (IR)) connections. For example, the display 104 may be separate from the computing device 102 and the computing device 102 (e.g., a streaming media player) communicates with the display 104 via an HDMI cable. By way of another example, the microphone 106 may be separate from the computing device 102 (e.g., the computing device 102 may be a television and the microphone 106 may be implemented in a remote control device) and voice inputs received by the microphone 106 are communicated to the computing device 102 via an IR or radio frequency wireless connection.

The computing device 102 also includes a processor system 110 that includes one or more processors, each of which can include one or more cores. The processor system 110 is coupled with, and may implement functionalities of, any other components or modules of the computing device 102 that are described herein. In one or more embodiments, the processor system 110 includes a single processor having a single core. Alternatively, the processor system 110 includes a single processor having multiple cores and/or multiple processors (each having one or more cores).

The computing device 102 also includes an operating system 112. The operating system 112 manages hardware, software, and firmware resources in the computing device 102. The operating system 112 manages one or more applications 114 running on the computing device 102, and operates as an interface between applications 114 and hardware components of the computing device 102.

The computing device 102 also includes an unknown voice input interpretation system 116. Voice inputs to the computing device 102 are received by the microphone 106 and provided to the unknown voice input interpretation system 116, which analyzes the voice inputs. For a voice input from a first user that is in a language known to the unknown voice input interpretation system 116, the unknown voice input interpretation system 116 recognizes the voice input and responds accordingly (e.g., carries out the command, displays a text representation of the voice input, and so forth). For a voice input from a first user that is in a language not known to the unknown voice input interpretation system 116, the unknown voice input interpretation system 116 receives an additional voice input from a second user that is in a language known to the unknown voice input interpretation system 116. The unknown voice input interpretation system 116 determines a meaning of the additional voice input, associates the meaning of the additional voice input with the voice input received from the first user, and uses this association to train a machine learning system of the unknown voice input interpretation system 116. In one or more embodiments, the unknown voice input interpretation system associates the meaning of the additional voice input with the voice input received from the first user only if context information indicates to make the association.

A language known to the unknown voice input interpretation system 116 is also referred to herein as a known language. A language not known to the unknown voice input interpretation system 116 is also referred to herein as an unknown language (e.g., a foreign language or unintelligible speech).

The unknown voice input interpretation system 116 can be implemented in a variety of different manners. For example, the unknown voice input interpretation system 116 can be implemented as multiple instructions stored on computer-readable storage media and that can be executed by the processor system 110. Additionally or alternatively, the unknown voice input interpretation system 116 can be implemented at least in part in hardware (e.g., as an application-specific integrated circuit (ASIC), a field-programmable gate array (FPGA), and so forth).

The computing device 102 also includes a storage device 130. The storage device 130 can be implemented using any of a variety of storage technologies, such as magnetic disk, optical disc, Flash or other solid state memory, and so forth. The storage device 130 can store various program instructions and data for the operating system 112, application 114, and/or unknown voice input interpretation system 116. In one or more embodiments, the storage device 130 stores buffered voice inputs that the unknown voice input interpretation system 116 was not able to associate with a meaning, as discussed in more detail below.

Figure 2:
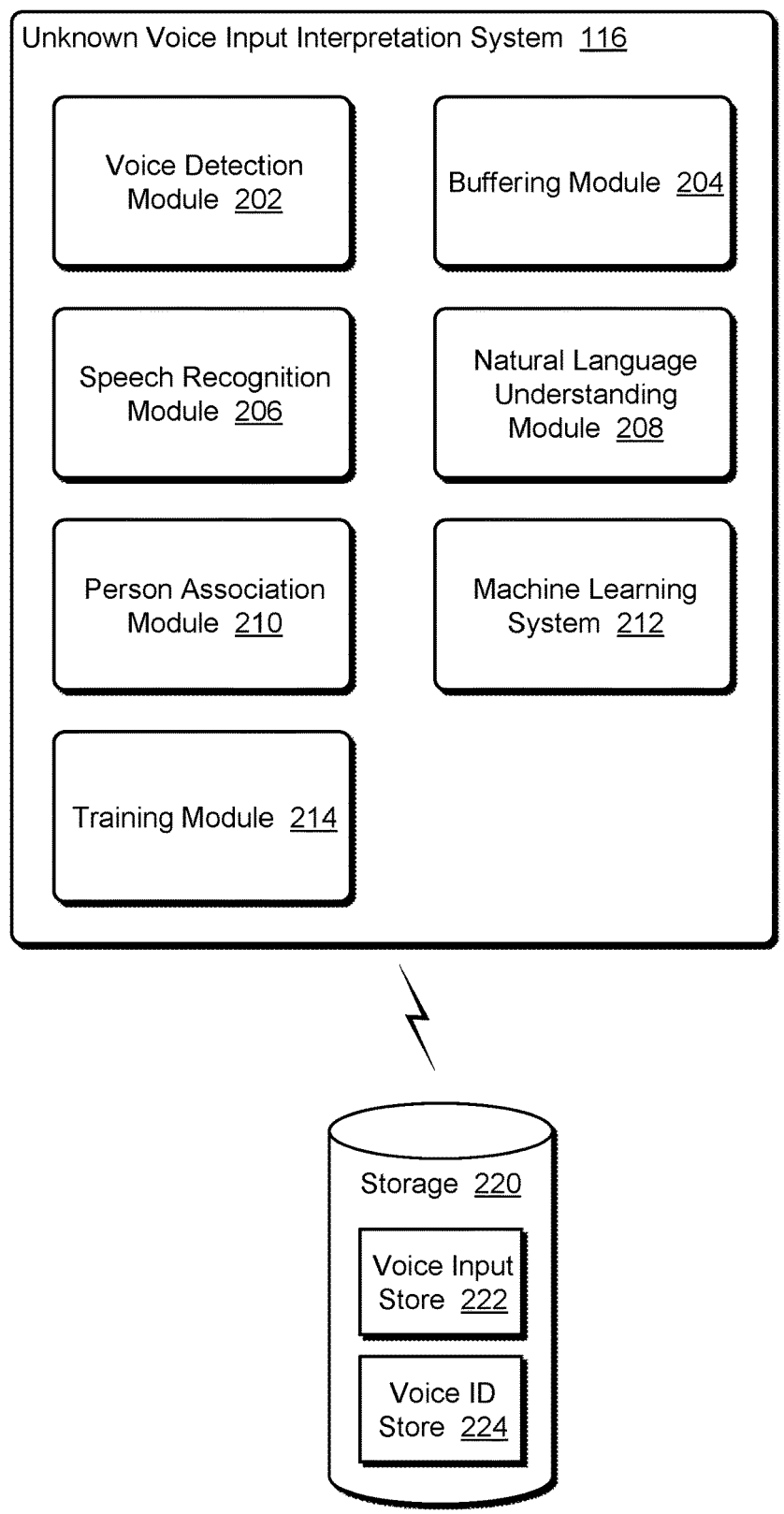
FIG. 2 illustrates an example unknown voice input interpretation system 116 in accordance with one or more embodiments.

FIG. 2 illustrates an example unknown voice input interpretation system 116 in accordance with one or more embodiments. The unknown voice input interpretation system 116 includes a voice detection module 202, a buffering module 204, a speech recognition module 206, a natural language understanding module 208, a person association module 210, a machine learning system 212, and a training module 214.

The voice detection module 202 implements functionality to detect voice inputs received by the microphone 106. These voice inputs can be received from any number of different users. Detecting voice inputs as discussed herein refers to detecting sounds that are received by the microphone 106. The sounds may or may not be in a known language. The determination of whether sounds are in a known language is made by the speech recognition module 206 as discussed in more detail below.

In one or more embodiments, the voice detection module 202 employs one or more of a variety of different public and/or proprietary voice detection algorithms to determine whether a sound captured by the microphone 106 is potentially a person's voice. For example, the voice detection module 202 can distinguish between sounds that are loud crashes or bangs and sounds that are potentially a person's voice, and not detect a voice input unless the sound captured by the microphone 106 is potentially a person's voice.

The buffering module 204 implements functionality to buffer received voice inputs. The buffering of voice inputs refers to storing the voice inputs in memory accessible to the unknown voice input system 200. The buffered voice inputs are then accessible to the other modules of the unknown voice input interpretation system 200. The buffering module 204 stores the voice inputs in locally accessible memory (e.g., random access memory) for use by the other modules of the unknown voice input interpretation system 200. The buffering module 204 also optionally stores the voice inputs in a voice input store 224 of long-term (e.g., nonvolatile) storage 220, which can be local storage (e.g., storage device 118) or remote storage (e.g., a remote server accessed via the Internet). Voice inputs in the voice input store 222 can be used by the other modules of the unknown voice input interpretation system 200 in situations in which the meaning of a subsequent voice inputs from a user becomes known, as discussed in more detail below.

The speech recognition module 206 implements functionality to recognize speech received by the microphone 106. The speech recognition module 206 detects words spoken by a user in a language known to the unknown voice input interpretation system 200. The speech recognition module 206 can be implemented using any of a variety of different public and/or proprietary speech recognition techniques. If the speech recognition module 206 detects the words spoken in a voice input, then the voice input is in a language known to the unknown voice input interpretation system 116. However, if the speech recognition module does not detect the words spoken in the voice input (and the machine learning system 212 does not know the meaning of the voice input, as discussed in more detail below), then the voice input is not in a language known to the unknown voice input interpretation system 116.

In one or more embodiments, the speech recognition module 206 assigns a voice identifier (voice ID) to each user of the computing device 102. A user of the computing device 102 can be any person whose voice the microphone 106 hears or picks up. Additionally or alternatively, a person (e.g., the owner of the computing device 102) may specify the people that are users of the computing device 102.

The speech recognition module 206 associates various characteristics of each user's voice with their voice ID, and maintains that association in a voice ID store 224 in the long-term (e.g., nonvolatile) storage 220, which can be local storage (e.g., storage device 118) or remote storage (e.g., a remote server accessed via the Internet). When a voice input is detected, the speech recognition module 206 compares the user's voice in that voice input to the characteristics of each user's voice in the voice ID store 224, and determines which voice ID in the voice ID store 224 is associated with that user. The determination of which voice ID in the voice ID store 224 is associated with a user's voice can be implemented using any of a variety of different public and/or proprietary speaker recognition techniques.

The natural language understanding module 208 implements functionality to understand the meaning of the words spoken by the user, as detected by the speech recognition module 206. For example, the meaning of the words spoken by the user may be "I'm hungry", "I'm tired", "my leg hurts", and so forth. The natural language understanding module 208 can be implemented using any of a variety of different public and/or proprietary natural language understanding techniques.

The person association module 210 implements functionality to determine relationships between users. These relationships include, for example, whether users are related to one another (e.g., a biologic or familial relationship) and if so what the relationship is, whether users are acquainted with one another and if so how, and so forth. The relationship between two users can be obtained in any of a variety of different manners, such as by receiving user input specifying the relationship. For example, a user may identify herself as the parent or spouse of another user. Information regarding the users and their relationships may also be obtained from various different databases or online resources, such as a knowledge graph. Knowledge graphs capture facts related to people, processes, applications, data, etc., and the relationships among them. They also capture evidence that can be used to attribute the strengths of these relationships. Such knowledge graphs can be implemented using any of a variety of public and/or proprietary techniques.

In one or more embodiments, each user has an associated voice ID as discussed above. This voice ID is also associated with the relationship information, which can be stored, for example, in the voice ID store 222. Thus, the relationship between two users, based on their voice IDs, can be readily determined by the voice detection module 202.

The machine learning system 212 implements functionality to interpret the meaning of voice inputs that are received but are in a language for which the speech recognition module 206 cannot recognize the words. The machine learning system 212 can be implemented using any of a variety of different public and/or proprietary machine learning techniques. Machine learning systems refer to a computer representation that can be tuned (e.g., trained) based on inputs to approximate unknown functions. In particular, machine learning systems can include a system that utilizes algorithms to learn from, and make predictions on, known data by analyzing the known data to learn to generate outputs that reflect patterns and attributes of the known data. For instance, a machine learning system can include decision trees, support vector machines, linear regression, logistic regression, Bayesian networks, random forest learning, dimensionality reduction algorithms, boosting algorithms, artificial neural networks, deep learning, and so forth.

The training module 214 implements functionality to associate voice inputs that are in a language not known to the unknown voice input interpretation system with meanings of voice inputs that are in a language known to the unknown voice input interpretation system. The training module 214 also implements functionality to train the machine learning system 212 using supervised learning based on this association. The training module 214 trains the machine learning system 212 using voice inputs that are in a language not known to the unknown voice input interpretation system 200, and the meanings associated with those voice inputs given a voice input received from another user in a language known to the unknown voice input interpretation system 200. For example, the training module 214 can train the machine learning system 212 by updating weights of filters in the machine learning system 212 to minimize the loss between the voice input in an unknown language and a known meaning of the voice input (as provided by another user). Various different loss functions can be used in training the machine learning system 212. Thus, the training module 214 trains the machine learning system 212 to learn the meanings associated with different sounds of the first user.

Figure 3:
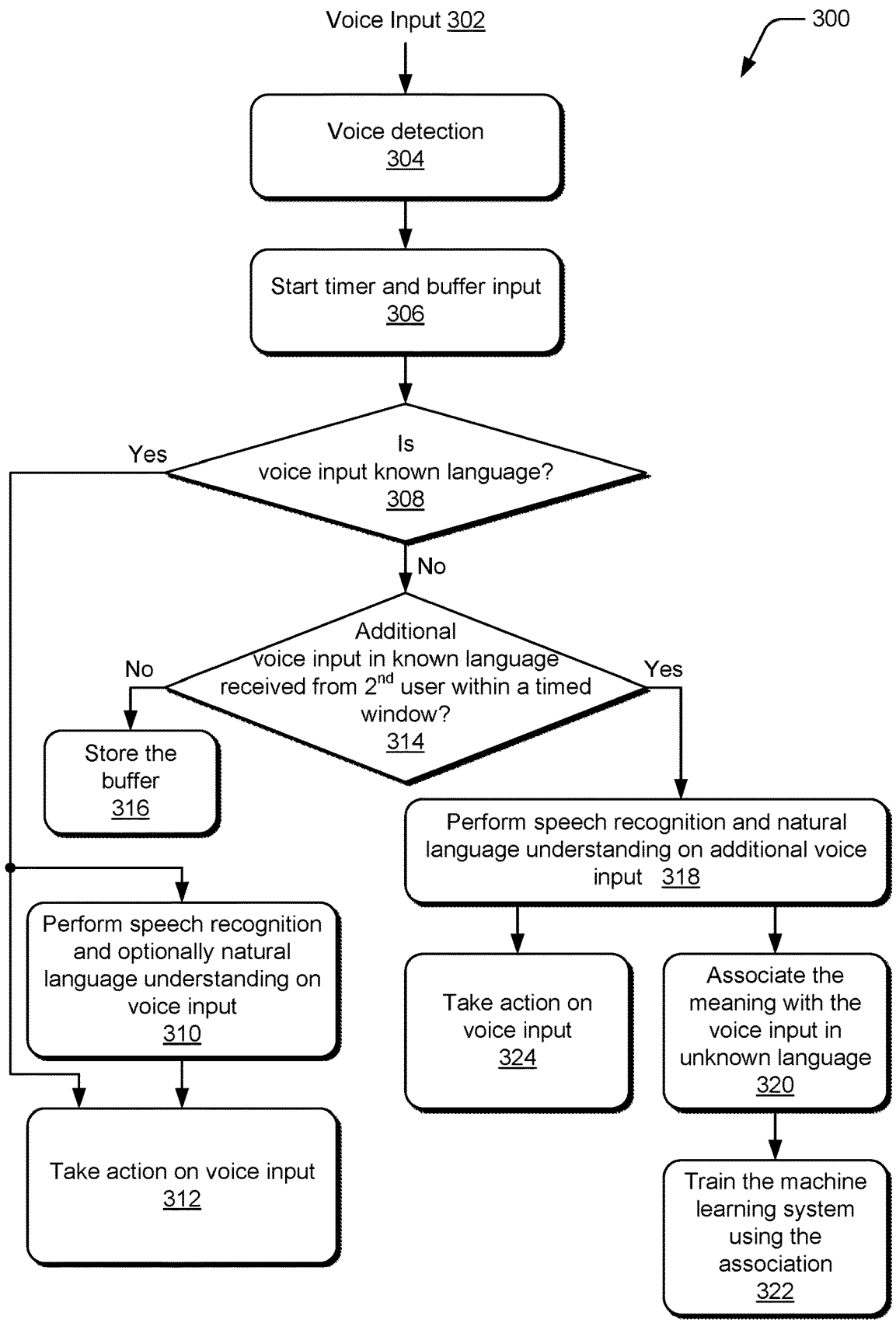
FIG. 3 illustrates an example operational flow of the unknown voice input interpretation system.

FIG. 3 illustrates an example operational flow 300 of the unknown voice input interpretation system 116. The operational flow 300 will be discussed with additional reference to the unknown voice input interpretation system 116 of FIGS. 1 and 2. A voice input 302 is received and detected by the voice detection module 202, shown as voice detection (block 304). In response to the voice detection module 202 detecting the voice input 302, the buffering module 204 buffers the voice input 302 and starts a timer (block 306).

The speech recognition module 206 receives the buffered voice input 302 and determines whether the voice input 302 is in a language known to the unknown voice input interpretation system 116 (block 308). The speech recognition module 206 can make this determination as the voice input 302 is being received and buffered (e.g., not waiting for the voice input 302 to end). Additionally or alternatively, the voice input 302 can wait until the voice input 302 ends (e.g., a threshold amount of time, such as 2 seconds, elapses where there is no voice input 302 received). No voice input 302 being received can be detected in various manners. For example, no voice input 302 being received can be detected in response to there being no sound captured by the microphone 106 above a threshold level (e.g., 25 dB). By way of another example, no voice input 302 being received can be detected in response to the voice detection module 202 detecting no sound being captured by the microphone 106 that could potentially be a user's voice.

In addition to the speech recognition module 206, the machine learning system 212 is used to determine whether the voice input 302 is in a language known to the unknown voice input interpretation system 116. Thus, as the machine learning system 212 is trained, voice inputs that were previously in a language unknown to the unknown voice input interpretation system 116 can become known to the unknown voice input interpretation system 116.

In response to determining that the voice input 302 is in a known language, the speech recognition module 206 attempts to perform speech recognition on the voice input 302 and the natural language understanding module 208 optionally attempts to perform natural language understanding on the voice input 302 (block 310). If the speech recognition and optionally natural language understanding is successful, then the computing device 102 takes an appropriate action on the voice input (block 312). The action can be taken by various components of the computing device 102, such as the unknown voice input interpretation system 116, an application 114, the operating system 112, and so forth. Any of a variety of different actions can be taken. For example, the voice input 302 can be a command and the action can be one or more of various operations as indicated by the command, such as playing a song, placing a phone call, performing an Internet search and displaying or playing back the results, and so forth. By way of another example, the computing device 102 can store the text recognized by the speech recognition module 206. By way of another example, the computing device 102 can display the text recognized by the speech recognition module 206.

In some situations the speech recognition module 206 may not be able to detect the words spoken in block 310. Such a situation exists, for example, when the machine learning system 212 is used to determine that the voice input 302 is in a language known to the unknown voice input interpretation system 116. In such situations, the machine learning system 212 gives the meaning/interpretation of the voice input 302 but may not give the exact words spoken. In such situations, the computing device 102 takes an appropriate action based on the meaning of the voice input 302. The action can be taken by various components of the computing device 102, and any of a variety of different actions can be taken. For example, if the voice input 302 is a command, the meaning of the voice input is the performance of the command, and the action can be one or more of various operations as indicated by the command, such as playing a song, placing a phone call, performing an Internet search and displaying or playing back the results, and so forth. By way of another example, the computing device 102 can store the meaning of the voice input 302 as determined by the machine learning system 212. By way of another example, the computing device 102 can display, audibly play back, or otherwise present the meaning of the voice input 302 as determined by the machine learning system 212.

Returning to block 308, if the voice input 302 is not a known language, then a determination is made as to whether an additional voice input in a known language is received within a timed window (block 314). This timed window begins when the voice input 302 is detected (e.g., when the timer started in block 306) and ends after a threshold amount of time elapses (e.g., 15 seconds). If an additional voice input in a known language is not received within the timed window, then the buffering module 204 stores the voice input (block 316). This stored voice input can be used by the unknown voice input interpretation system 116 as discussed in more detail below. Although this timed window is discussed as beginning when the voice input 302 is detected, additionally or alternatively the timed window can begin when the voice input 302 ends.

If an additional voice input in a known language is received within the timed window, then the speech recognition module 206 performs speech recognition on the voice input 302 and the natural language understanding module 208 optionally performs natural language understanding on the additional voice input (block 318). The training module 214 associates the meaning of the additional voice input, obtained from performing natural language understanding on the additional voice input, with the voice input 302 (block 320). Thus, the meaning of the voice input 302 from a first user, which was not in a known language, is associated with the meaning of the additional voice input received from the second user. The training module 214 also uses the meaning associated with the additional voice input received from the second user to train the machine learning system 212 to learn the meanings associated with different sounds of the user that provided the voice input in the unknown language (block 322). The machine learning system 212 thus effectively learns the language of the user, and voice inputs that were previously unknown become known by the unknown voice input interpretation system.

The computing device 102 also optionally takes an appropriate action on the additional voice input (block 324). The action can be taken by various components of the computing device 102, such as the unknown voice input interpretation system 116, an application 114, the operating system 112, and so forth. Any of a variety of different actions can be taken, analogous to the discussion above regarding block 312. For example, the additional voice input can be a command and the action can be one or more of various operations as indicated by the command, such as playing a song, placing a phone call, performing an Internet search and displaying or playing back the results, and so forth. By way of another example, the computing device 102 can store the text recognized by the speech recognition module 206. By way of another example, the computing device 102 can display, audibly play back, or otherwise present the text recognized by the speech recognition module 206.

The machine learning system 212 thus learns meanings of different voice inputs from the first user based on additional voice inputs from the second user. The operational flow 300 is followed for each voice input from a user. Numerous additional voice inputs can thus later be received from the first user, and the machine learning system 212 can be used to determine the meaning/interpretation of those additional voice inputs due to the training of the machine learning system 212.

The operational flow 300 is discussed as associating the meaning of an additional voice input from a second user with the voice input from a first user that is not in a language known to the unknown voice input interpretation system if the additional voice input is received within the timed window. Additionally or alternatively, various other context information can be applied to determine whether to associate the meaning of an additional voice input from a second user with the voice input from a first user that is not in a language known to the unknown voice input interpretation system.

One type of context information that can be applied to determine whether to associate the meaning of an additional voice input from a second user with the voice input from a first user that is not in a language known to the unknown voice input interpretation system is the relationship between the two users. The relationship between two users can be determined, for example, by the person association module 210 as discussed above. In one or more embodiments, the training module 214 associates the meaning with the voice input in the unknown language (block 320) only in response to the person association module 210 determining that there is a relationship between the two users. Additionally or alternatively, the training module 214 may associate the meaning with the voice input in the unknown language (block 320) only in response to the person association module 210 determining that there is a particular type of relationship between the two users (e.g., the two users are spouses, the two users have a parent/child relationship, the two users are family members, the two users have a caregiver/patient relationship, and so forth).

Another type of context information that can be applied to determine whether to associate the meaning of an additional voice input from a second user with the voice input from a first user that is not in a language known to the unknown voice input interpretation system is the proximity of the two users. In one or more embodiments, the training module 214 associates the meaning with the voice input in the unknown language (block 320) only in response to determining that the two users are in close proximity to one another. The two users being in close proximity to one another can be determined in any of a variety of different manners. For example, the sound level of each user is measured and the two users are determined to be in close proximity to one another if the sound level of each exceeds a threshold level (e.g., 60 dB) or if the difference between the sound levels of each user is less than another threshold level (e.g., 20 dB). By way of another example, an image can be captured by an imager (e.g., a camera or other image capture device of the computing device 102). Assuming the person association module 210 has images of each user, the two users are determined to be in close proximity to one another if the captured image includes both users (or if each user is included in at least one image captured within a threshold amount of time, such as during the timed window discussed in block 314). Lip movement in the images captured (e.g., during the timed window discussed in block 314) can confirm which proximate person is speaking at any given time.

By way of yet another example, acoustic beam steering can also be used to tell the direction of sounds received at the computing device 102. The two users are determined to be in close proximity to one another if sound (e.g., voice inputs) of each of the two users are received from approximately the same direction (e.g., within a cone having a 30 degree opening angle at its vertex (which is the computing device 102)). By way of still another example, thermal presence sensors in the computing device 102 can sense the presence of the second user, such as from detection of body heat. If the computing device 102 senses the presence of both users (e.g., each is within 5 or 10 feet of the computing device 102), then the two users are determined to be in close proximity to one another.

Furthermore, in one or more embodiments sentiment analysis is used to determine whether to associate the meaning of an additional voice input from a second user with the voice input from a first user that is not in a language known to the unknown voice input interpretation system. Sentiment analysis is performed by the natural language understanding module 208 to determine whether the additional voice input is in response to the first user. Any of a variety of public and/or proprietary sentiment analysis techniques can be used to determine the subject of the additional voice input. The natural language understanding module 208 determines that the additional voice input is in response to the first user in response to the subject of the additional voice input being the first user. For example, the information regarding users and their relationships determined or obtained by the person association module 210 can be used to associate the subject of the additional voice input with the user that provided the voice input in the unknown language. By way of another example, if the natural language understanding module 208 determines that the additional voice input is responsive to someone who just spoke (e.g., by referring to "you"), then the natural language understanding module 208 determines that the additional voice input is in response to the first user.

The use of additional context information and/or sentiment analysis helps ensure that the second user is responding to the first user and is knowledgeable of the first user, and thus is likely able to accurately identify the meaning of the voice input from the first user. For example, using the voice ID and relationship information prevents training the machine learning system 212 from a stranger's voice input that has no idea who the first person is or what the first person might want.

The operational flow 300 is discussed as using natural language understanding to determine the meaning of an additional voice input from a second user. Additionally or alternatively, various other information can be applied (e.g., by the natural language understanding module 208 or the training module 214) to determine the meaning of an additional voice input from a second user. For example, occurrence timing can be used to predict a particular meaning of the voice input 302 from the first user. Based on multiple additional voice inputs from the second user over time and their determined meanings, a regular pattern can be detected by the unknown voice input interpretation system 116. E.g., the unknown voice input interpretation system 116 can determine that a baby is hungry every 2 hours, that a baby is tired at 8:00 pm every day, and so forth. This information can be used by the unknown voice input interpretation system 116 to determine that a voice input 302 from the first user at 8:00 pm is associated with the first user being tired, that if one voice input from the first user is associated with the first user being tired and another voice input 302 is received from the first user 2 hours later then this other voice input 302 is also associated with the first user being tired, and so forth.

It should be noted that the unknown voice input interpretation system 116 is discussed as including a machine learning system 212. The training module 214 trains the machine learning system 212 to determine the meaning/interpretation of voice inputs from the first user discussed above. Additionally or alternatively, the unknown voice input interpretation system 116 can include multiple machine learning systems 212, each corresponding to a different user (e.g., each being associated with a particular voice ID). Based on which of these different users a voice input in an unknown language is received from, the training module 214 can train the appropriate one of the multiple machine learning systems 212 in block 322.

In some situations, an additional voice input in a known language is not received from a second user within a timed window (block 314), and the buffered voice input 302 is stored (block 316) as discussed above. This buffered voice input 302 is stored and when a subsequent voice input is received from that same user, and that subsequent voice input is associated with the meaning from a subsequent additional voice input from a second user, the training module 214 determines whether the stored voice input is close to the subsequent voice input. If the stored voice input is close to the subsequent voice input, then the training module 214 associates the stored voice input with the meaning of the subsequent additional voice input and uses that association along with the stored voice input to train the machine learning system 212.

Figure 4:
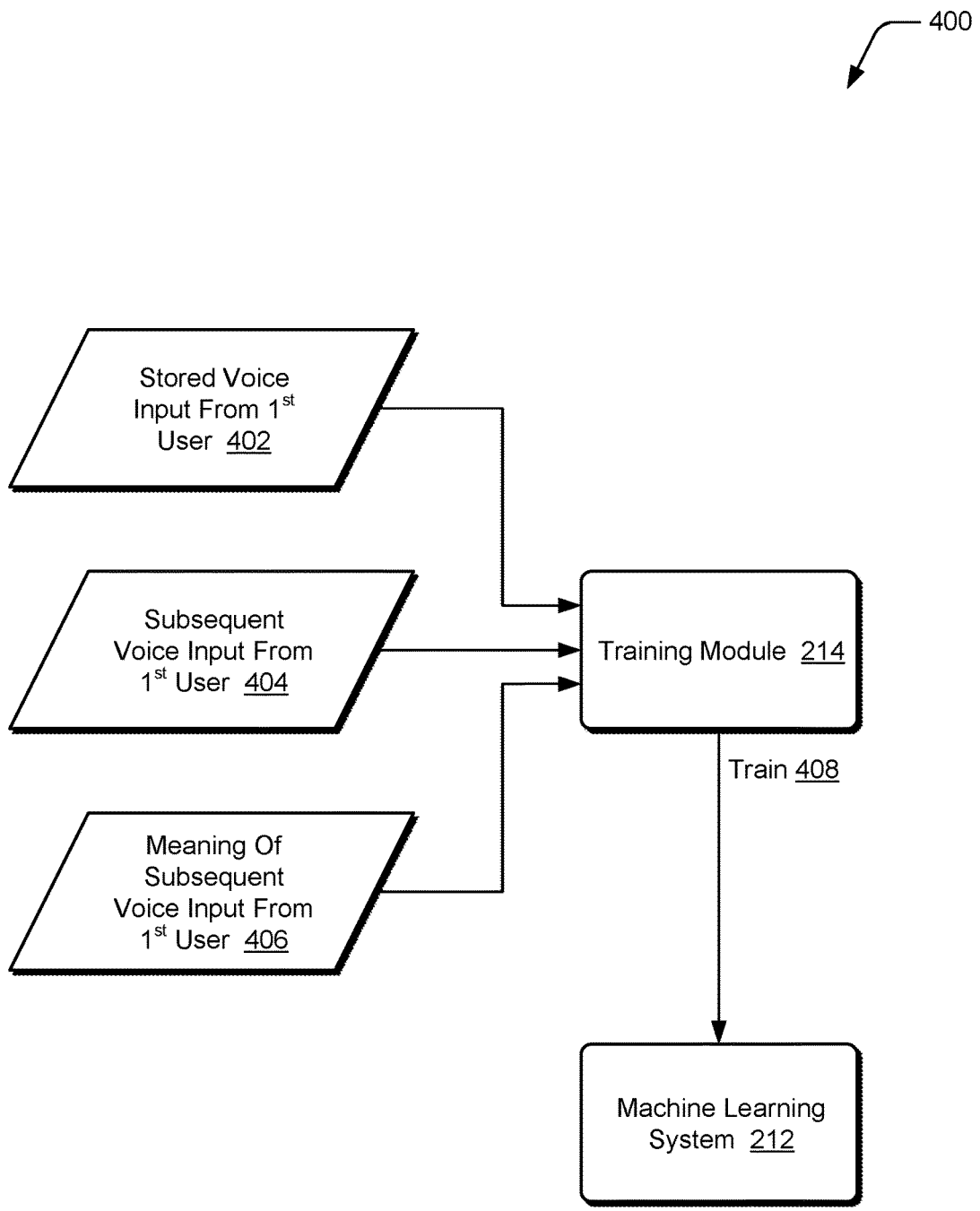
FIG. 4 illustrates an example of using the stored voice input to train the machine learning system.

FIG. 4 illustrates an example 400 of using the stored voice input to train the machine learning system 212. In the example 400, a stored voice input from a first user 402, a subsequent voice input from the first user 404, and a meaning of the subsequent voice input from the first user 406 are illustrated as inputs to the training module 214. The stored voice input from the first user 402 is a voice input that was received and stored in block 316 because an additional voice input in a known language was not received from a second user within a timed window. The subsequent voice input from the first user 404 was received after the stored voice input 402 was received, and the subsequent voice input 404 is associated with the meaning from a subsequent additional voice input from a second user. Furthermore, the stored voice input 402 was determined to be close to the subsequent voice input 404.

The training module 214 assumes that, because the stored voice input 402 is close to the subsequent voice input 404, that both have the same meaning. Therefore, the training module 214 uses the subsequent voice input 404 and the meaning of the subsequent voice input 406 to train 408 the machine learning system 212. Additionally, the training module 214 uses the stored voice input 402 and the meaning of the subsequent voice input 406 to train 408 the machine learning system 212.

Whether the stored voice input 402 is close to the subsequent voice input 404 can be determined in a variety of different manners. In one or more embodiments, both the stored voice input 402 and the subsequent voice input 404 are converted into vectors and a distance between the two vectors is determined. If the distance is less than a threshold amount then the stored voice input 402 is determined to be close to the subsequent voice input 404. If the distance is not less than the threshold amount then the stored voice input 402 is determined to not be close to the subsequent voice input 404. This threshold amount is set so that if the distance is less than the threshold amount there is a high probability (e.g., at least 90%) that the stored voice input 402 and the subsequent voice input 404 have the same meaning. This threshold amount can vary based on various different factors, such as the number of components in the two vectors, the method used to determine the distance between the vectors, and so forth.

Returning to FIG. 2, the training module 214 is discussed as being trained using the unknown language from a particular user. It should be noted that situations can arise in which the training module 214 is trained using unknown language from multiple users. For example, in some situations it may be that there are common characteristics that multiple users have with respect to the unknown language they are speaking. For example, people who have suffered strokes may have multiple parts of their bodies affected, and there may be common characteristics in the way people speak after a stroke has affected a particular part of their bodies. In such situations, training data from multiple users that have the same part of their bodies affected by a stroke can be shared across multiple unknown voice input interpretation systems. This training data would be the voice input from the person that suffered the stroke and the associated meaning determined from the voice input of another person that understood what the person that suffered the stroke was saying.

Figure 5:
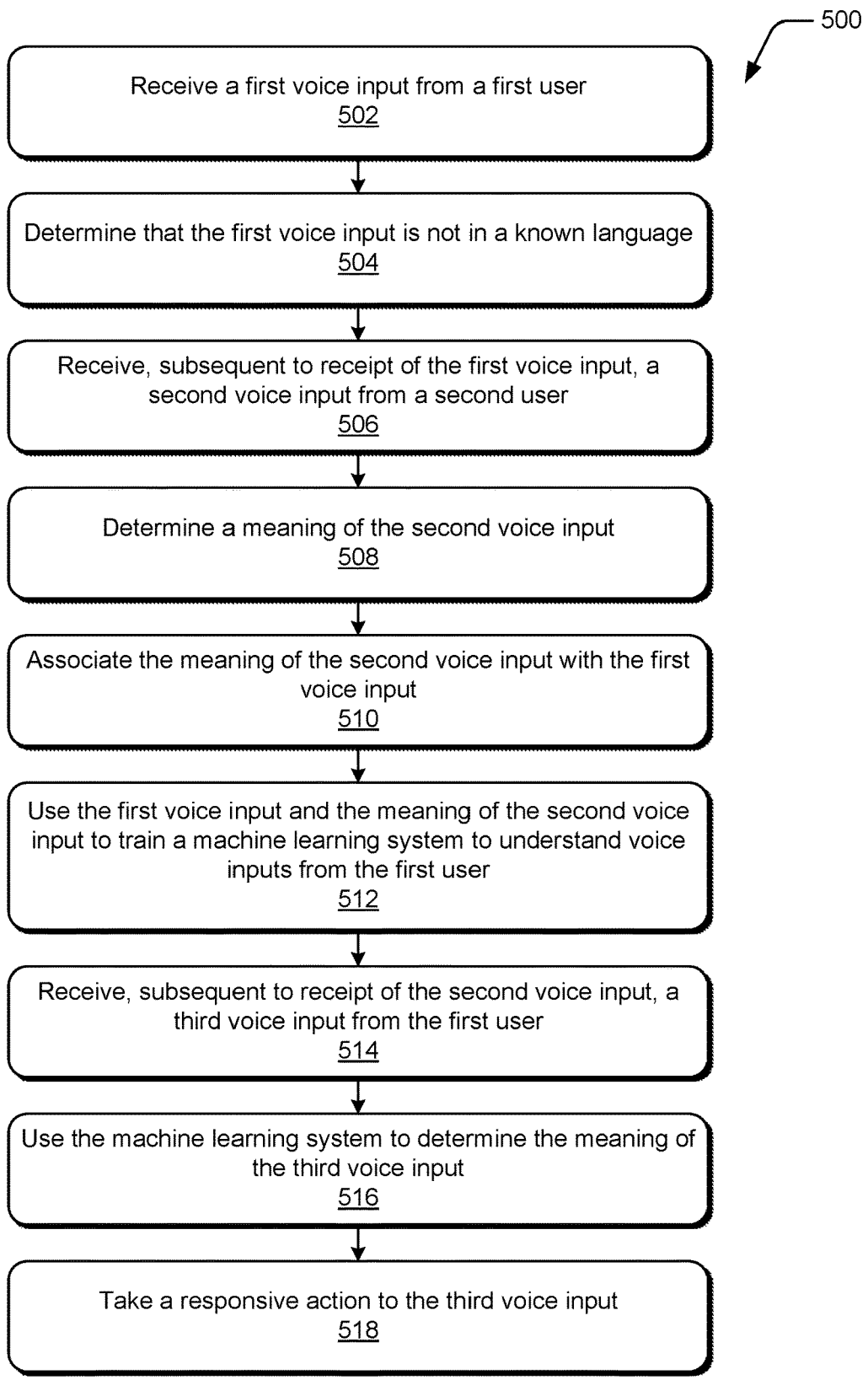
FIG. 5 illustrates an example process for implementing the techniques discussed herein in accordance with one or more embodiments.

FIG. 5 illustrates an example process 500 for implementing the techniques discussed herein in accordance with one or more embodiments. Process 500 is carried out by an unknown voice input interpretation system, such as the unknown voice input interpretation system 116 of FIG. 1 or FIG. 2, and can be implemented in software, firmware, hardware, or combinations thereof. Process 500 is shown as a set of acts and is not limited to the order shown for performing the operations of the various acts.

In process 500, a first voice input is received from a first user (act 502).

A determination is made that the first voice input is not a known language to the unknown voice input interpretation system (act 504). This determination is made on a speech recognition module recognizing the words in the first voice input and/or a machine learning system recognizing the meaning of the first voice input.

Subsequent to receiving the first voice input, a second voice input is received from a second user (act 506). The second voice input is in a language known to the unknown voice input interpretation system.

A meaning of the second voice input is determined (act 508). This meaning is determined using speech recognition and natural language understanding as discussed above.

The meaning of the second voice input is associated with the first voice input (act 510).

The first voice input and the meaning of the second voice input are used to train a machine learning system of the unknown voice input interpretation system (act 512). This training of the machine learning system is to allow the machine learning system to understand voice inputs from the first user.

Subsequent to receiving the second voice input, a third voice input is received from the first user (act 514). The third voice input is thus from the same user as the first voice input was from, and may be received at any time (e.g., minutes, hours, days, etc.) after the first voice input was received.

The machine learning system is used to determine a meaning of the third voice input (act 516). Thus, as the machine learning system is trained, voice inputs that were previously in a language unknown to the unknown voice input interpretation system can become known.

A responsive action is taken to the third voice input (act 518). This responsive action is based on the meaning of the third voice input as determined by the machine learning system. Any of a variety of responsive actions can be taken. For example, if the third voice input is a command, the meaning of the third voice input is the performance of the command, and the action can be one or more of various operations as indicated by the command, such as playing a song, placing a phone call, performing an Internet search and displaying or playing back the results, and so forth. By way of another example, the meaning of the third voice input can be stored for later use. By way of another example, the meaning of the third voice input can be displayed, audibly played back, or otherwise presented.

It should be noted that the unknown voice input interpretation system 116 is discussed as obtaining, determining, and storing various information regarding users of the computing device 102. In one or more embodiments, these actions are taken only in response to user approval or authorization to do so. For example, a voice ID may be created for a user only if the user approves or authorizes its creation.

Figure 6:
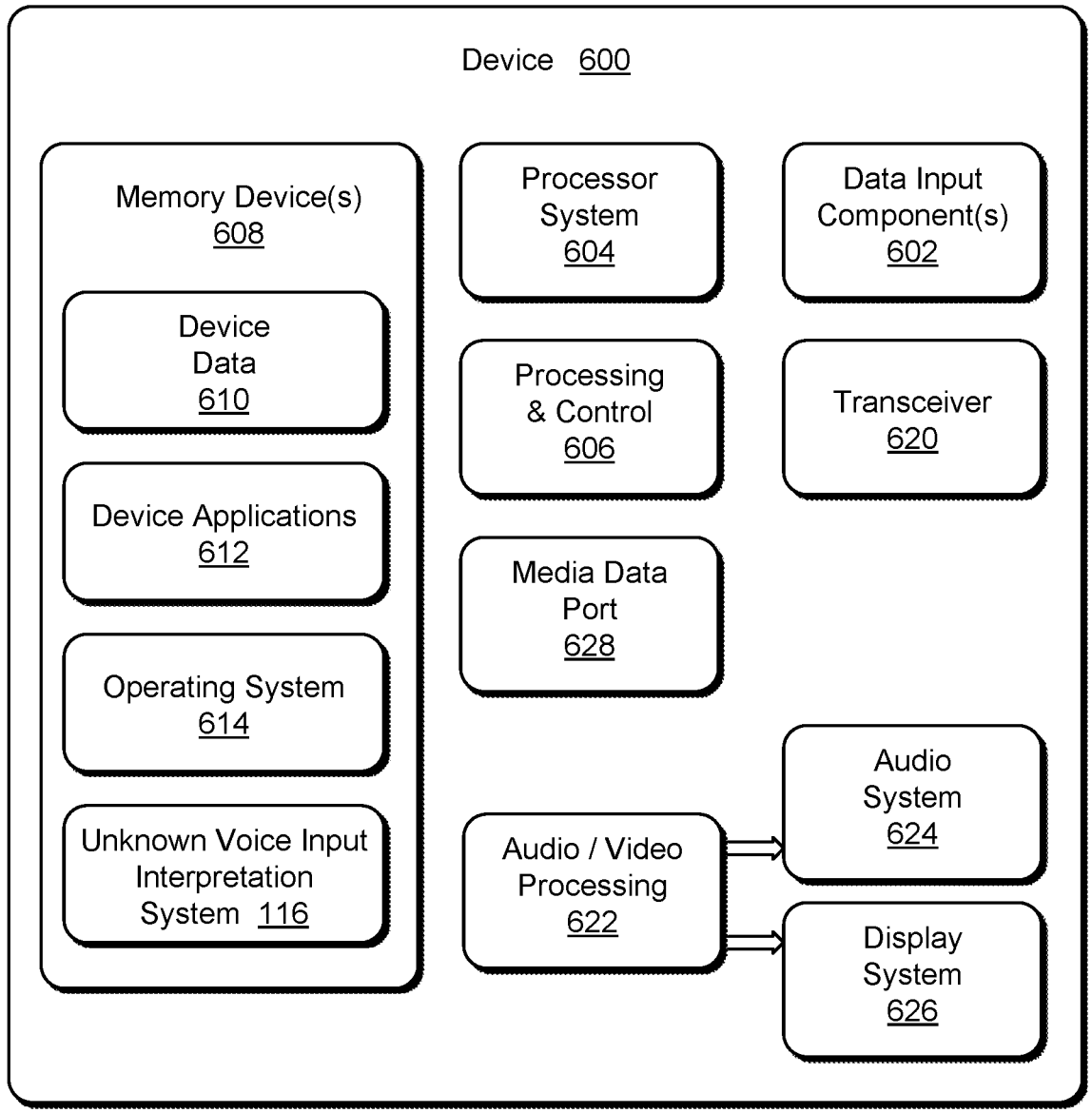
FIG. 6 illustrates various components of an example electronic device that can implement embodiments of the techniques discussed herein.

FIG. 6 illustrates various components of an example electronic device 600 that can be implemented as a computing device as described with reference to any of the previous FIGS. 1, 2, 3, 4, and 5. The device 600 may be implemented as any one or combination of a fixed or mobile device in any form of a consumer, computer, portable, user, communication, phone, navigation, gaming, messaging, Web browsing, paging, media playback, or other type of electronic device.

The electronic device 600 can include one or more data input components 602 via which any type of data, media content, or inputs can be received such as user-selectable inputs, messages, music, television content, recorded video content, and any other type of audio, video, or image data received from any content or data source. The data input components 602 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 602 may also include various other input components such as microphones, touch sensors, keyboards, and so forth.

The electronic device 600 of this example includes a processor system 604 (e.g., any of microprocessors, controllers, and the like) or a processor and memory system (e.g., implemented in a system on a chip), which processes computer executable instructions to control operation of the device 600. A processor system 604 may be implemented at least partially in hardware that can include components of an integrated circuit or on-chip system, an application specific integrated circuit, a field programmable gate array, a complex programmable logic device, and other implementations in silicon or other hardware. Alternatively or in addition, the electronic device 600 can be implemented with any one or combination of software, hardware, firmware, or fixed logic circuitry implemented in connection with processing and control circuits that are generally identified at 606. Although not shown, the electronic device 600 can include a system bus or data transfer system that couples the various components within the device 600. A system bus can include any one or combination of different bus structures such as a memory bus or memory controller, a peripheral bus, a universal serial bus, or a processor or local bus that utilizes any of a variety of bus architectures.

The electronic device 600 also includes one or more memory devices 608 that enable data storage such as random access memory, nonvolatile memory (e.g., read only memory, flash memory, erasable programmable read only memory, electrically erasable programmable read only memory, etc.), and a disk storage device. A memory device 608 provides data storage mechanisms to store the device data 610, other types of information or data (e.g., data backed up from other devices), and various device applications 612 (e.g., software applications). For example, an operating system 614 can be maintained as software instructions with a memory device and executed by the processor system 604.

In one or more embodiments the electronic device 600 includes an unknown voice input interpretation system 116, described above. Although represented as a software implementation, the unknown voice input interpretation system 116 may be implemented as any form of a voice input interpretation application, module, firmware that is installed on the device 600, a hardware implementation of the modules, and so on.

Moreover, in one or more embodiments the techniques discussed herein can be implemented as a computer-readable storage medium having computer readable code stored thereon for programming a computing device (for example, a processor of a computing device) to perform a method as discussed herein. Computer-readable storage media refers to media and/or devices that enable persistent and/or non-transitory storage of information in contrast to mere signal transmission, carrier waves, or signals per se. Computer-readable storage media refers to non-signal bearing media. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. The computer-readable storage medium can be, for example, memory devices 608.

The electronic device 600 also includes a transceiver 620 that supports wireless and/or wired communication with other devices or services allowing data and control information to be sent as well as received by the device 600. The wireless and/or wired communication can be supported using any of a variety of different public or proprietary communication networks or protocols such as cellular networks (e.g., third generation networks, fourth generation networks such as LTE networks), wireless local area networks such as Wi-Fi networks, and so forth.

The electronic device 600 can also include an audio or video processing system 622 that processes audio data or passes through the audio and video data to an audio system 624 or to a display system 626. The audio system or the display system may include any devices that process, display, or otherwise render audio, video, display, or image data. Display data and audio signals can be communicated to an audio component or to a display component via a radio frequency link, S-video link, high definition multimedia interface (HDMI), composite video link, component video link, digital video interface, analog audio connection, or other similar communication link, such as media data port 628. In implementations the audio system or the display system are external components to the electronic device. Alternatively or in addition, the display system can be an integrated component of the example electronic device, such as part of an integrated touch interface.

Although embodiments of techniques for implementing two-person automatic speech recognition training to interpret unknown voice inputs have been described in language specific to features or methods, the subject of the appended claims is not necessarily limited to the specific features or methods described. Rather, the specific features and methods are disclosed as example implementations of techniques for implementing two-person automatic speech recognition training to interpret unknown voice inputs.

What is claimed is:

1. A method implemented in an unknown voice input interpretation system of a computing device, the method comprising:
   receiving a first voice input from a first user;
   determining that the first voice input is not in a known language to the unknown voice input interpretation system;
   receiving, subsequent to receiving the first voice input, a second voice input from a second user;
   determining a meaning of the second voice input;
   determining whether there is a known relationship between the first user and the second user based on a voice ID of the first user, a voice ID of the second user, and a knowledge graph;
   associating the meaning of the second voice input with the first voice input only in response to determining that there is a known relationship between the first user and the second user;
   using the first voice input and the meaning of the second voice input to train a machine learning system of the unknown voice input interpretation system to understand voice inputs from the first user;
   receiving a third voice input from the first user; and
   using the machine learning system to determine a meaning of the third voice input.

2. The method as recited in claim 1, the method further comprising taking an action in response to the third voice input based on the meaning of the third voice input.

3. The method as recited in claim 1, wherein the associating further comprises associating the meaning of the second voice input with the first voice input only in response to the second voice input being received within a threshold amount of time of receiving the first voice input.

4. The method as recited in claim 1, wherein the associating further comprises associating the meaning of the second voice input with the first voice input only in response to determining that the first user and the second user are in close proximity to one another.

5. The method as recited in claim 1, wherein the determining the meaning of the second voice input comprises using sentiment analysis to determine whether the second voice input is in response to the first user, and wherein the associating comprises associating the meaning of the second voice input with the first voice input only in response to determining that the second voice input is in response to the first user.

6. The method as recited in claim 1, the method further comprising:

receiving a fourth voice input from the first user that is not in a known language to the unknown voice input interpretation system;
storing the fourth voice input;
subsequently receiving a fifth voice input from the first user that is not in a known language to the unknown voice input interpretation system;
determining a meaning of the fifth voice input;
determining that the fourth voice input is close to the fifth voice input;
using the fourth voice input and the meaning of the fifth voice input to train the machine learning system to understand voice inputs from the first user; and
using the fifth voice input and the meaning of the fifth voice input to train the machine learning system to understand voice inputs from the first user.

7. A computing device comprising:
a processor; and
a computer-readable storage medium having stored thereon multiple instructions that implement an unknown voice input interpretation system and that, responsive to execution by the processor, cause the processor to perform acts comprising:
  determining that a first voice input received from a first user is not in a known language to the unknown voice input interpretation system;
  determining a meaning of a second voice input received, subsequent to receipt of the first voice input, from a second user;
  associating the meaning of the second voice input with the first voice input;
  using the first voice input and the meaning of the second voice input to train a machine learning system of the unknown voice input interpretation system to understand voice inputs from the first user;
  using the machine learning system to determine a meaning of a third voice input received from the first user;
  receiving a fourth voice input from the first user that is not in a known language to the unknown voice input interpretation system;
  storing the fourth voice input;
  subsequently receiving a fifth voice input from the first user that is not in a known language to the unknown voice input interpretation system;
  determining a meaning of the fifth voice input;
  determining that the fourth voice input is close to the fifth voice input;
  using the fourth voice input and the meaning of the fifth voice input to train the machine learning system to understand voice inputs from the first user; and
  using the fifth voice input and the meaning of the fifth voice input to train the machine learning system to understand voice inputs from the first user.

8. The computing device as recited in claim 7, the acts further comprising taking an action in response to the third voice input based on the meaning of the third voice input.

9. The computing device as recited in claim 7, wherein the associating comprises associating the meaning of the second voice input with the first voice input only in response to the second voice input being received within a threshold amount of time of receiving the first voice input.

10. The computing device as recited in claim 7, wherein the associating comprises associating the meaning of the second voice input with the first voice input only in response to determining that there is a known relationship between the first user and the second user.

11. The computing device as recited in claim 10, further comprising determining whether there is a known relationship between the first user and the second user based on a voice ID of the first user, a voice ID of the second user, and a knowledge graph.

12. The computing device as recited in claim 7, wherein the associating comprises associating the meaning of the second voice input with the first voice input only in response to determining that the first user and the second user are in close proximity to one another.

13. The computing device as recited in claim 7, wherein the determining the meaning of the second voice input comprises using sentiment analysis to determine whether the second voice input is in response to the first user, and wherein the associating comprises associating the meaning of the second voice input with the first voice input only in response to determining that the second voice input is in response to the first user.

14. An unknown voice input interpretation system comprising:
a speech recognition module, implemented at least in part in hardware, configured to determine that a first voice input received from a first user is not in a known language to the unknown voice input interpretation system;
a natural language understanding module, implemented at least in part in hardware, configured to determine a meaning of a second voice input received, subsequent to receipt of the first voice input, from a second user;
a training module, implemented at least in part in hardware, configured to associate the meaning of the second voice input with the first voice input only in response to determining that the first user and the second user are in close physical proximity to one another, and to use the first voice input and the meaning of the second voice input to train a machine learning system of the unknown voice input interpretation system to understand voice inputs from the first user; and
the machine learning system, implemented at least in part in hardware, configured to determine a meaning of a third voice input received from the first user.

15. The system as recited in claim 14, wherein the training module is further configured to associate the meaning of the second voice input with the first voice input only in response to the second voice input being received within a threshold amount of time of receiving the first voice input.

16. The system as recited in claim 14, further comprising a person association module configured to determine whether there is a known relationship between the first user and the second user based on a voice ID of the first user, a voice ID of the second user, and a knowledge graph, and wherein the training module is further configured to associate the meaning of the second voice input with the first voice input only in response to determining that there is a known relationship between the first user and the second user.

17. The system as recited in claim 14, wherein the natural language understanding module is further configured to use sentiment analysis to determine whether the second voice input is in response to the first user, and wherein the training module is further configured to associate the meaning of the second voice input with the first voice input only in response to the natural language understanding module determining that the second voice input is in response to the first user.

18. The system as recited in claim 14, wherein the training module is further configured to associate the meaning of the second voice input with the first voice input only in response to determining that the first user and the second user are acquainted with one another.

19. The system as recited in claim 14, wherein the training module is further configured to associate the meaning of the second voice input with the first voice input only in response to determining there is a familial relationship between the first user and the second user.

20. The system as recited in claim 14, wherein the training module is further configured to associate the meaning of the second voice input with the first voice input only in response to determining there is a biologic relationship between the first user and the second user.

* * * * *